United States Patent Office 3,085,938
Patented Apr. 16, 1963

3,085,938
ANALGESIC ARYLOXYPROPANOLAMINES
Frank M. Berger, Princeton, and Bernard J. Ludwig, North Brunswick, N.J., assignors to Carter Products, Inc., New York, N.Y., a corporation of Maryland
No Drawing. Filed Mar. 23, 1959, Ser. No. 800,972
6 Claims. (Cl. 167—65)

This invention relates to novel analgesic compositions useful for relieving pain when administered systemically to warm blooded animals. The present invention also includes a method for relieving pain in warm blooded animals. Also, included within the scope of the instant invention are novel compounds possessing unique analgesic activity.

The use of analgesic compositions for relieving pain in warm blooded animals is well known. Among the many drugs for this purpose have been aryloxypropanolamine compounds. Many of the known analgesics, however, have not proven entirely satisfactory because of their limited analgesic activity.

Accordingly, it is an object of this invention to provide novel analgesic compositions having unique pain-relieving properties. A further object of this invention is to provide a novel method for relieving pain. Yet a further object of this invention is to provide novel compounds having unique analgesic properties.

Objects and advantages of the invention will be set forth in part hereinafter and in part will be obvious herefrom, or may be learned by practice with the invention, the same being realized and attained by means of the steps, methods, compositions, combinations and improvements pointed out in the appended claims.

The invention consists in the novel steps, methods, compositions, combinations and improvements herein shown and described.

It has been discovered that certain novel compositions of matter when administered systemically to warm blooded animals exert unique pain-relieving action. The term "systemically" as used herein means a mode of administration whereby the active ingredient when given to warm blooded animals is effective in the whole body and not merely in the locus of application. This includes both oral administration or administration by injection. More particularly, the novel analgesic compositions of this invention comprise a carrier of such nature that the analgesic composition may be administered systemically to warm blooded animals, and a pain-relieving active ingredient selected from the group consisting of compounds having the structural formula:

$$\underset{CH_3}{\underset{|}{\overset{CH_3}{\overset{|}{\bigcirc}}}}-O-CH_2-\underset{OH}{\overset{H}{\underset{|}{C}}}-CH_2-R$$

wherein R is selected from the group consisting of

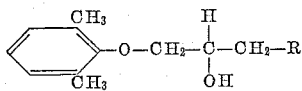
4-morpholino (—N⟨  ⟩O)

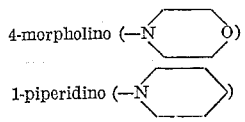
1-piperidino (—N⟨  ⟩)

and

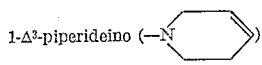
1-Δ³-piperideino (—N⟨  ⟩)

groups; and, the physiologically acceptable salts of the foregoing bases.

It is seen, therefore, that the base compounds used as the active ingredient of the novel compositions of matter of this invention are 1-(2,6-dimethylphenoxy)-3-(4-morpholino)-2-propanol and 1-(2,6-dimethylphenoxy)-3-Δ³-piperideino-2-propanol, both of which are novel compounds, and 1-(2,6-dimethylphenoxy)-3-piperidino-2-propanol. As indicated above, the physiologically acceptable salts of the aforementioned bases may be used as the active ingredient of the analgesic compositions of this invention. Examples of such salts are the hydrohalides (preferably the hydrochlorides), salts with readily tolerated mineral acids, such as sulfuric or phosphoric acid, and salts with the commonly used organic acids such as acetic, citric, maleic and tartaric acids.

The bases used as the active ingredients of the novel analgesic compositions of this invention may be prepared by the reaction of 2,6-dimethylphenol with epichlorhydrin to give 1-(2,6-dimethylphenoxy)2,3-epoxypropane followed by reaction of this intermediate compound with the appropriate cyclic amine to give the desired compound.

A description of the preparation of the intermediate compound 1-(2,6-dimethylphenoxy)-2,3-epoxypropane, the bases used in accordance with this invention and a number of salts of such bases follows:

EXAMPLE A

*Preparation of 1-(2,6-Dimethylphenoxy)-2,3-Epoxypropane*

61 grams of 2,6-dimethylphenol and 69 grams of epichlorhydrin were dissolved in 200 ml. of dioxane. The mixture was heated to reflux temperature and 24 grams of sodium hydroxide dissolved in 50 ml. water was added with stirring and the mixture refluxed for three hours. After cooling, the mixture was added to 900 ml. of benzene and the benzene soluble portion, after extracting with water, was worked up by distillation of the solvent under reduced pressure. On subjecting the residue to fractional distillation there was obtained 62.5 grams of product distilling at 86–93° at a pressure of 0.3 mm. $N_D^{25}$ 1.5162.

EXAMPLE B

*Preparation of 1-(2,6-Dimethylphenoxy)-3-(4-Morpholino)-2-Propanol*

20 grams of 1-(2,6-dimethylphenoxy)-2,3-epoxypropane and 14.5 grams (10% excess) of morpholine were mixed together in a suitable vessel and heated to 120°. The reaction taking place was controlled by cooling of the vessel. The excess morpholine was removed by distillation under reduced pressure and the residue obtained was allowed to solidify. Recrystallization from hexane gave 22 grams of purified product, melting point 60–62.5°.

*Analysis.*—Calculated for $C_{15}H_{23}NO_3$: N, 5.28%. Found: N, 5.28%. The hydrochloride was prepared by the addition of anhydrous hydrogen chloride to a solution of the above compound in anhydrous ether. The hydrochloride was purified by recrystallization from isopropanol. Melting point 159–160°. *Analysis.*—Calculated for $C_{15}H_{24}O_3NCl$: C 59.71%, H 8.02%, Cl 11.75%. Found: C 59.45%, H 7.98%, Cl 11.34%.

EXAMPLE C

*Preparation of 1-(2,6-Dimethylphenoxy)-3-Piperidino-2-Propanol*

This compound was prepared in the same manner as described in the above example using 1-(2,6-dimethylphenoxy)-2,3-epoxypropane and piperidine in xylene. The product obtained on removal of the solvent was recrystallized from aqueous ethanol. Melting point 50–51°. *Analysis.*—Calculated for $C_{16}H_{25}O_2N$: N 5.32%. Found: N 5.60%.

The hydrochloride salt of the above compound was prepared in the same manner as described in Example B and when recrystallized from acetone, melted at 169–170°.

*Analysis.*—Calculated for $C_{16}H_{26}O_2NCl$: C 64.2%, H 8.75%, N 4.68%, Cl 11.83%. Found: C 64.27%, H 8.87%, N 4.51%, Cl 11.73%.

The maleate salt of the above compound was prepared by the addition of maleic acid to a solution of the base in anhydrous ethyl acetate. The mixture was refluxed for 15 minutes and the product obtained by cooling the solution. On crystallization from ethyl acetate, the maleate salt melted at 110–112°. *Analysis.*—Calculated for $C_{20}H_{29}NO_6$: C, 63.29%; H, 7.72%. Found: C, 63.53%; H, 7.59%.

EXAMPLE D

*Preparation of 1-(2,6-Dimethylphenoxy)-3-$\Delta^3$-Piperideino-2-Propanol*

100 grams of 1-(2,6-dimethylphenoxy)-2,3-epoxypropane and a 10% molar excess of 1,2,5,6-tetrahydropyridine were reacted together in toluene as described in the above example. The excess amine was removed by extracting the toluene solution with water and the crude product obtained by distillation of the toluene under reduced pressure. The product which solidified on cooling to room temperature was purified by recrystallization from pentane. A yield of 110 grams was obtained. Melting point 56.5–57.5°. *Analysis.*—Calculated for $C_{16}H_{23}O_2N$: N 5.36%. Found: N 5.40%.

The hydrochloride was prepared as described in the above example. On recrystallization from a mixture of alcohol and ether the hydrochloride salt melted at 148–149°. Calculated for $C_{16}H_{24}O_2NCl$: C, 64.60%; H, 8.13%; Cl, 11.90%. Found: C, 64.81%; H, 8.10%; Cl, 12.04%. All temperatures herein are in degrees centigrade.

As indicated hereinbefore, the carrier used in the compositions of the instant invention is of such nature that the analgesic composition may be administered systemically to warm blooded animals. The pain-relieving active ingredient is preferably administered orally in the form of pills, tablets or capsules. When the composition is in the form of a solid, the active ingredient is generally in an amount from 25 to 90% by weight of the total composition. The active ingredient may also be dissolved in a suitable solution for injection. When the composition is in the form of a solution, the active ingredient is generally in an amount from about 0.1 g. to 10 grams per 100 ml. of solution. An effective single dose of the active ingredient generally is in the range of 25 to 800 mg.

The procedure by which the analgesic or pain-relieving activity of the compositions of this invention was evaluated will now be discussed. The test employed for determining analgesic activity was the conventionally used "hot plate method" described by Woolfe and MacDonald in J. Pharmacology, Exp. Therap. 83:300, 1944. In the "hot plate method" a painful stimulus is applied to a mouse prior to and after administration of the drug being tested. If the drug in the dose administered possesses analgesic properties, the mouse will be able to withstand the painful stimulus for a much longer duration than if the drug in the dose given is non-analgesic. More particularly, the apparatus used for carrying the aforementioned method consists of a metallic plate heated to a temperature of about 55.5±0.5° C. This heated plate has around its circumference a hollow glass cylinder to contain the test mouse or mice on the plate.

The normal mice used in the present investigation showed signs of discomfort within an average of 10.5 seconds.

The drug under consideration was administered to mice in groups of ten in varying dose levels to determine the mean effective dose ($ED_{50}$). The mice were placed on the hot plate 10 minutes, 20 minutes and 30 minutes after injection of the drug under consideration and the number of mice showing analgesia determined. In determining analgesia, if a mouse was able to withstand the hot plate for at least 30 seconds without signs of discomfort, it was considered that the drug in the dose administered exerted analgesic activity. On the other hand, if a mouse showed signs of discomfort in less than 30 seconds when placed on the hot plate, it was considered that the drug under consideration in the dose given did not exert analgesic activity.

Following the above described procedure, a number of compositions were tested for analgesic activity when administered interperitoneally to mice. The compositions tested were water solution of the phenoxypropanolamine hydrochloride salts indicated in Table I.

In the following Table I, the $ED_{50}$ value is the effective dose expressed in mg. of active ingredient per kilogram of mouse (mg./kg.) which will produce analgesia in 50% of the group animals tested. The $LD_{50}$ value is the effective dose (mg./kg.) which will produce death in 50% of the group of animals tested. In the below Table I under the heading $ED_{50}$, the value >100 means that no analgesic activity was observed when the salt indicated was given in doses up to 100 mg./kg.

TABLE I $$X-CH_2-\underset{\underset{OH}{|}}{\overset{\overset{H}{|}}{C}}-CH_2-R \cdot HCl$$

| Compound No. | X | R | $ED_{50}$ | $LD_{50}$ |
|---|---|---|---|---|
| 1 | phenoxy | morpholino | >100 | >100 |
| 2 | 2-methylphenoxy | do | 130±7 | 315±30 |
| 3 | 2-methylphenoxy | piperidino | 64.5±7.7 | 92±4.3 |
| 4 | 2-methylphenoxy | $\Delta^3$-piperideino | 89±6 | 146±5.4 |
| 5 | 2-methylphenoxy | morpholino | 51±3.3 | 162±9.4 |

TABLE I—Continued $$X-CH_2=\overset{\overset{H}{|}}{\underset{\underset{OH}{|}}{C}}-CH_2-R \cdot HCl$$

| Compound No. | X | R | ED₅₀ | LD₅₀ |
|---|---|---|---|---|
| 6 | 2,6-dimethylphenoxy | piperidino | 24±1.9 | 77±5.5 |
| 7 | 2,6-dimethylphenoxy | Δ³-piperideino | 35±2.8 | 89±5.1 |
| 8 | 2,6-dimethylphenoxy | morpholino | >100 | >100 |
| 9 | 2,4-dimethylphenoxy | do | >100 | >100 |
| 10 | 2-methyl-6-tert-butylphenoxy | do | >100 | >100 |
| 11 | 2-methyl-6-tert-butylphenoxy | Δ³-piperideino | >100 | >100 |
| 12 | 2,4,6-trimethylphenoxy | morpholino | >100 | >100 |

The analgesic compositions of the present invention as illustrated by compounds 5, 6 and 7 of Table I possess unique pain-relieving properties. It is quite surprising that the solutions of 2,6-dimethylphenoxy propanolamine hydrochlorides used in accordance with the present invention possess vastly superior analgesic activity when compared to closely related phenoxy propanolamine hydrochloride solutions.

Solutions 5, 6 and 7 containing the 2,6-dimethylphenoxy propanolamines used in accordance with this invention show unexpected analgesic activity when compared to:

(1) Solution 1 containing an unsubstituted phenoxy propanolamine.

(2) Solutions 2, 3 and 4 containing 2-monomethylphenoxy propanolamines.

(3) Solution 8 containing 3,5-dimethylphenoxy propanolamine.

(4) Solution 9 containing 2,4-dimethylphenoxy propanolamine.

(5) Solutions 10 and 11 containing 2-methyl-6-tertiary butyl phenoxy propanolamines.

(6) Solution 12 containing 2,4,6-trimethylphenoxy propanolamine.

The following are examples of analgesic tablets and solutions formed in accordance with the instant invention:

EXAMPLE I

A tablet is compressed from a composition having the following formula:

| | Mgs. |
|---|---|
| 1-(2,6-dimethylphenoxy)-3-(4-morpholino)-2-propanol hydrochloride | 100 |
| Corn starch | 50 |
| Magnesium stearate | 2 |
| Alginic acid | 8 |

EXAMPLE II

A tablet is compressed from a composition having the following formula:

| | Mgs. |
|---|---|
| 1-(2,6-dimethylphenoxy)-3-Δ³-piperideino-2-propanol hydrochloride | 100 |
| Corn starch | 30 |
| Magnesium stearate | 1 |
| Alginic acid | 8 |
| Gum acacia | 10 |

EXAMPLE III

A tablet is compressed from a composition having the following formula:

|  | Mgs. |
|---|---|
| 1-(2,6-dimethylphenoxy)-3-piperidino-2-propanol hydrochloride | 100 |
| Corn starch | 30 |
| Magnesium stearate | 1 |
| Alginic acid | 5 |

EXAMPLE IV

A tablet is compressed from a composition having the following formula:

|  | Mgs. |
|---|---|
| 1-(2,6-dimethylphenoxy)-3-piperidino-2-propanol maleate | 100 |
| Corn starch | 20 |
| Lactose | 20 |
| Magnesium stearate | 2 |
| Alginic acid | 4 |

EXAMPLE V

A tablet is compressed from a composition having the following formula:

|  | Mgs. |
|---|---|
| 1-(2,6-dimethylphenoxy)-3-$\Delta^3$-piperidino-2-propanol sulphate | 100 |
| Corn starch | 50 |
| Magnesium stearate | 2 |
| Alginic acid | 8 |

EXAMPLE VI

A tablet is compressed from a composition having the following formula:

|  | Mgs. |
|---|---|
| 1-(2,6-dimethylphenoxy)-3-$\Delta^3$-piperideino-2-propanol maleate | 100 |
| Corn starch | 50 |
| Magnesium stearate | 1 |
| Alginic acid | 5 |

EXAMPLE VII

A tablet is compressed from a composition having the following formula:

|  | Mgs. |
|---|---|
| 1-(2,6-dimethylphenoxy)-3-(4-morpholino)-2-propanol citrate | 100 |
| Corn starch | 20 |
| Magnesium stearate | 1 |
| Alginic acid | 10 |

EXAMPLE VIII

A tablet is compressed from a composition having the following formula:

|  | Mgs. |
|---|---|
| 1-(2,6-dimethylphenoxy)-3-$\Delta^3$-piperideino-2-propanol tartrate | 100 |
| Corn starch | 20 |
| Lactose | 20 |
| Magnesium stearate | 1 |
| Alginic acid | 8 |

EXAMPLE IX

An injectable solution is prepared by dissolving 10 grams of 1-(2,6-dimethylphenoxy)-3-(4-morpholino)-2-propanol hydrochloride in water to a final volume of 100 ml. to give a 10% (w./v.) solution.

EXAMPLE X

An injectable solution is prepared by dissolving 5 grams of 1-(2,6-dimethylphenoxy)-3-$\Delta^3$-piperideino-2-propanol hydrochloride in water to a final volume of 100 ml. to give a 5% (w./v.) solution.

EXAMPLE XI 1 gram of 1-(2,6-dimethylphenoxy)-3-piperideino-2-propanol hydrochloride is dissolved in isotonic saline to give a final volume of 100 ml. to form a 1% (w./v.) solution of the 1-(2,6-dimethylphenoxy)-3-piperideino-2-propanol hydrochloride in isotonic saline solution.

The invention in its broader aspects is not limited to the specific steps, methods, compositions, combinations and improvements described but departures may be made therefrom within the scope of the accompanying claims without departing from the principles of the invention and without sacrificing its chief advantages.

What is claimed is:

1. The method of relieving pain in a warm blooded animal comprising administering systemically to said animal a compound

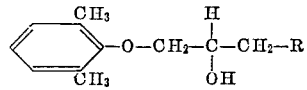

wherein R is selected from the group consisting of 4-morpholino, 1-piperidino and 1-$\Delta^3$-piperideino groups; and, the physiologically acceptable salts of the foregoing bases.

2. The method of relieving pain in a warm blooded animal according to claim 1, wherein R in the structural formula is 4-morpholino.

3. The method of relieving pain in a warm blooded animal according to claim 1, wherein R in the structural formula is 1-piperidino.

4. The method of relieving pain in a warm blooded animal according to claim 1, wherein R in the structural formula is 1-$\Delta^3$-piperideino.

5. 1-(2,6-dimethylphenoxy)-3-(4-morpholino)-2-propanol and physiologically acceptable salts thereof.

6. 1-(2,6-dimethylphenoxy)-3-$\Delta^3$-piperideino-2-propanol and physiologically acceptable salts thereof.

References Cited in the file of this patent

Beasley: J. Pharm. and Pharmacol., vol. 10, No. 1, January 1958, pages 47–60, 68–70.

Harris: J. Applied Physiology, July 1954, pages 84–88.

Batterman: JAMA, July 10, 1954, pages 965–968.

Van Itallie: Pulse of Pharmacy, vol. 12, No. 2, 1958, pages 3–9.